Feb. 12, 1963   J. M. EVJEN   3,077,244
DAMPING ASSEMBLY
Filed Sept. 15, 1961   2 Sheets-Sheet 1

INVENTOR.
JOHN M. EVJEN
BY *Derek P Lawrence*
HIS ATTORNEY

Feb. 12, 1963   J. M. EVJEN   3,077,244
DAMPING ASSEMBLY
Filed Sept. 15, 1961   2 Sheets-Sheet 2
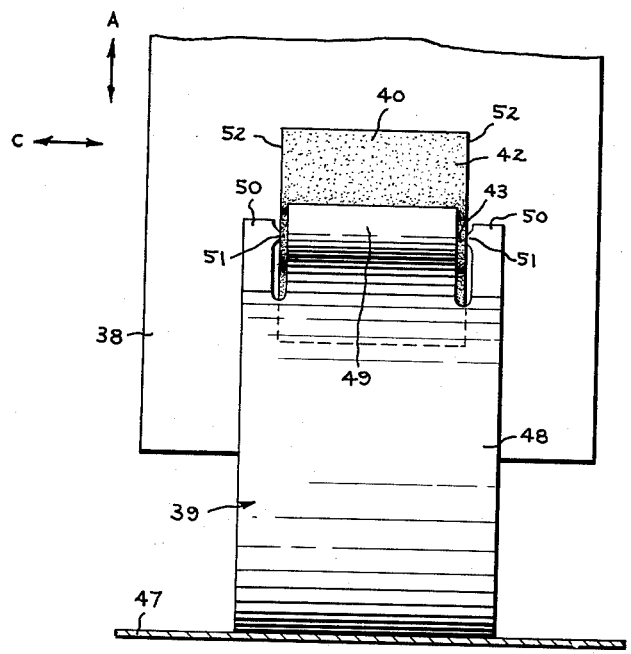
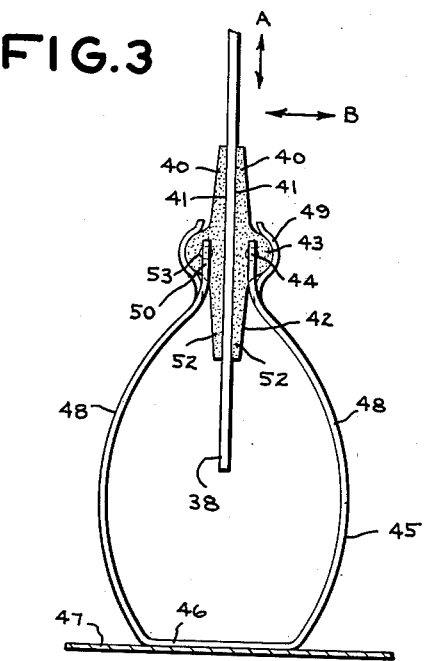
INVENTOR.
JOHN M. EVJEN
BY Derek P Lawrence
HIS ATTORNEY United States Patent Office 3,077,244
Patented Feb. 12, 1963

3,077,244
DAMPING ASSEMBLY
John M. Evjen, Louisville, Ky., assignor to General
Electric Company, a corporation of New York
Filed Sept. 15, 1961, Ser. No. 138,495
4 Claims. (Cl. 188—1)

This invention relates to damping assemblies, and more particularly to damping assemblies of the type including a pad adapted to rub against a flat surface formed on an oscillating system for absorbing energy from the movable system.

It is an object of my invention to provide an improved damping assembly wherein a highly effective and economical structure is provided for the components of the damping assembly so that it may cooperate suitably with a flat surface formed on the moving system which is to have energy absorbed from it.

A more specific object of my invention is to provide such a system where the damping pad is provided and is supported in such a way that the position of the supporting means does not shorten at all the useful life of the damping pad yet provides pivotal movability of the damping pad relative to its support.

In one aspect of my invention, I provided a damping system which is intended to be used with a flat member forming part of a system oscillative in up to three dimensions. The assembly includes a damping pad whose flat front surface is intended to rub against the flat member so as to effect the desired goal of absorbing energy from the oscillating system. The damping pad also has a back surface on which there is a projection formed as a segment of a circle in a plane perpendicular to the front surface. The pad is intended to be biased against the flat member by a biasing member which has a central end portion formed as an arc of a circle concave relative to the projections and of like radius; as a result, the central end portion of the biasing member receives the projection in mating relation therewith. The biasing member further is provided with two outer end portions which engage the side surfaces of the pad so as to form a pivot for the pad along a line which passes perpendicularly through the center of the circle. Preferably, in order to obtain the maximum advantage from my invention, the center of the circle is at least as far from the front surface of the pad as the main part of the back surface. As a result, the support is achieved without any effect on the length of life of the pad because the pad may wear out completely (from the rubbing engagement) without interference from the supporting means.

The subject matter which I regard as my invention is particularly pointed out and distinctly claimed in the concluding portion of this specification. The invention itself, however, both to its organization and method of operation, may best be understood by reference to the following description taken in conjunction with the accompanying drawings.

In the drawings,

FIGURE 2 is a front elevational view of the improved damper assembly of my invention; and FIGURE 3 is a side elevational view of the improved damper assembly of my invention.

Figure 1:
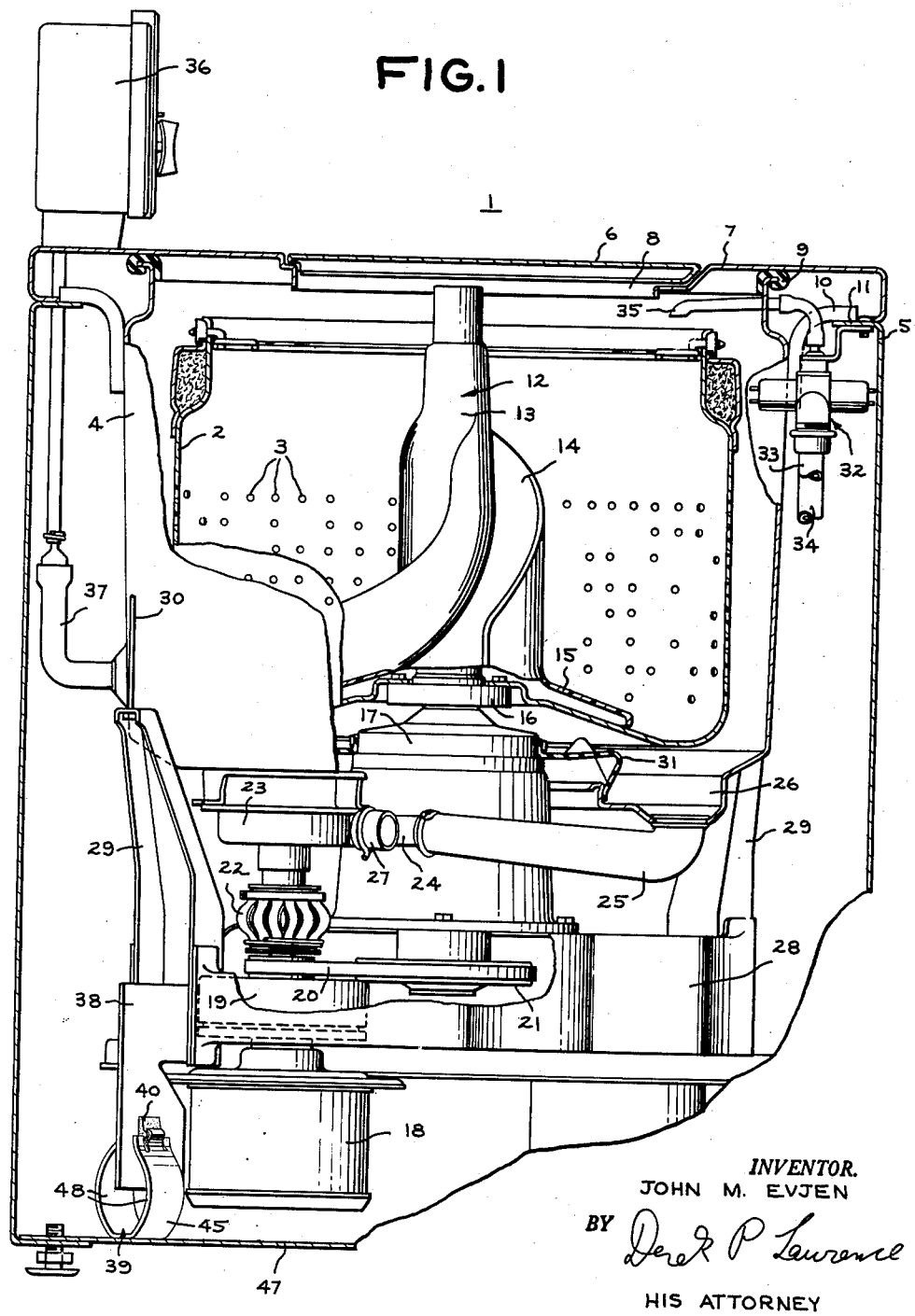
FIGURE 1 is a side elevational view of a machine, specifically a clothes washing machine, wherein my invention is provided to damp the oscillations of a moving system which forms an integral part of the machine, the view being partially broken away and partially in section to illustrate details.

Referring now to the drawing, and particularly to FIGURE 1, a brief description will be provided of the machine of FIGURE 1 in order to afford an understanding of the type of machine in which my invention may find highly advantageous use.

There is shown in FIGURE 1 an agitator type clothes washing machine 1 having a conventional basket or clothes receiving receptacle 2 provided over its side and bottom walls with perforations 3 and disposed within an outer imperforate tub or casing 4, the basket 2 and casing 4 forming together container means for containing liquid and clothes to be washed.

Tub 4 is rigidly mounted within an appearance cabinet 5 which is arranged so as to substantially enclose the washing machine. The cabinet 5 includes a cover 6 hingedly mounted in the top portion 7 of the cabinet for providing access to an opening 8 to the basket 2. As shown, a gasket 9 may be provided so as to form a seal between the top of tub 4 and portion 7 of the cabinet, thereby to prevent escape of moisture and moist air into the cabinet around the tub. The rigid mounting of tub 4 within cabinet 5 may be effected by any suitable means. As a typical example of one such means, I may provide a number of strap members 10, each of which is secured at one end to an inturned flange 11 of the cabinet and at its other end to the outside of tub 4.

At the center of basket 2 there is positioned a vertical axis agitator generally indicated by the numeral 12 which may include a center post 13 and a plurality of curved water circulating vanes 14 joined at their lower ends by an outwardly flared skirt 15. The agitator 12 represents a means for causing appropriate circulation of liquid within the tub and this in turn causes flexing of the clothes contained in the basket so that a mechanical washing action is performed on them. Both the clothes basket 2 and the agitator 12 are rotatably mounted. The basket is mounted on a flange 16 extending up out of a transmission assembly 17, and the agitator 12 is mounted on a shaft (not shown) which extends upwardly through the hub 16 into the center post 13 and is secured to the agitator so as to drive it.

During a typical cycle of operation of the machine 1, water may be introduced into tub 4 and basket 2, and the agitator 12 may then be oscillated back and forth on its axis, that is in a horizontal plane within the basket to wash clothes therein. Then, after a predetermined period of this washing action, basket 2 may be rotated at high speed to extract centrifugally the washing liquid from the clothes and discharge it to drain. Following this extraction operation, a supply of clean water may be introduced into the basket for rinsing the clothes and the agitator may again be oscillated. Finally, the basket may once more be rotated at high speed to extract the rinse water.

The basket 2 and agitator 12 may be driven through any suitable means as the specific transmission means is not a feature of the present invention. By way of example, I have shown them as driven from a reversible motor 18 through a drive including a clutch 19 mounted on the motor shaft. The clutch may be of the conventional type which allows motor 18 to start without a load and then accept the load as it comes up to speed. A suitable belt 20 transmits power to assembly 17 through a pulley 21. Depending upon the direction of motor rotation, pulley 21 and transmission 17 are driven in opposite directions. The transmission 17 is so arranged that it supports and drives both the agitator drive shaft and the basket mounting hub 16. When motor 18 is rotated in one direction, the transmission causes agitator 12 to oscillate in a substantially horizontal plane within the basket 2. Conversely, when motor 18 is driven in the opposite direction, the transmission rotates the wash basket 2 and agitator 12 together at high speed for centrifugal extraction. While many conventional types of driving mechanisms may be used, reference is made to Patent 2,844,225 issued to James R. Hubbard et al. on July 22, 1958, and owned by General Electric Company, assignee of the present invention. That patent discloses in detail the structural characteristics of a transmission assembly suitable for use in the illustrated machine.

In addition to operating the transmission 17 as described, motor 18 may also provide a direct drive through a flexible coupling 22 to a pump structure 23 having an inlet 24 connected by a conduit 25 to an opening 26 formed in the bottom of tub 4. The pump 23 also has an outlet 27 which is adapted to be connected to a suitable drain (not shown). Pump 23 is so formed that when motor 18 rotates in the direction to cause agitation the pump is ineffective, but when the motor 18 rotates in the direction to cause spin, the pump draws liquid from tub 4 and discharges it through outlet 27.

The motor 18, clutch 19, transmission 17, basket 2, and agitator 12 form together a suspended, or moving, washing and centrifuging system. The moving system supported by the stationary structure of the washing machine which includes tub 4 so as to permit isolation of oscillations from the stationary structure. It will be understood that such oscillations occur primarily as a result of high speed spinning of basket 2 with a load of clothes therein as mentioned above. Any of many suitable suspension constructions may be used. One such suitable construction includes a bracket member 28, with transmission 17 mounted on top thereof and motor 18 mounted to the underside thereof. The bracket member in turn is secured to upwardly extending rigid members 29, and each of the two upwardly extending members 29 is connected to a cable 30 supported from the top of the machine. While only a portion of the suspension system is shown in the drawing, such a vibration isolating system is fully described and claimed in Patent 2,987,189 issued to me on June 6, 1961 and assigned to General Electric Company, assignee of the present invention.

In order to accommodate the movement that occurs between the basket 2 which forms a part of the moving system, and the tub 4 which is secured to the stationary cabinet 5, tub 4 is joined to the upper part of transmission 17 by a suitable boot member 31. Boot 31 may be of any suitable configuration, many of which are known in the art, to permit relative motion of the parts to which it is joined without leakage therebetween.

Completing the general description of the machine 1, a suitable assembly 32 may be provided for controlling the flow of hot and cold water to the machine from inlet conduits 33 and 34. At appropriate times the assembly 32 causes water to enter the machine through conduit 35 so as to fill the machine to an appropriate level. In this connection, suitable means (not shown) for sensing the liquid level and causing the cessation of the entrance of water to the machine may be provided within the control panel 36 of the machine. In this connection, there is shown a tube 37 connected to the inside of tub 4 near the bottom thereof and extending up into the control panel.

Included in the moving system are a suitable number of substantially vertically extending flat plate members 38 (as shown), each of which is intended to cooperate with a damping assembly, one of which is shown at 39 and which forms the essence of my invention. While it will be understood that any suitable number of such assemblies are provided, one conventional arrangement is to provide four such assemblies cooperating with four members 38 positioned 90 degrees from each other relative to the axis of rotation of the basket 2 of the machine.

Referring now to FIGURES 2 and 3, they show one of the assemblies 39 in cooperative relation with one of the flat plate members 38. It will be understood that, with the type of suspension system that is expected to be used, the plate member 38 is movable in one or more of three dimensions as shown by the arrows A, B, and C (arrows A and B appearing in FIGURE 3 and arrows A and C appearing in FIGURE 2) as the moving system of the washing machine oscillates unbalanced rotation of basket 2.

While machine 1 is normally so designed that there is no danger of excessive oscillation at full speed, there are of necessity critical speeds at which the machine must pass through a natural frequency. As a result, there would be excessive oscillation when the machine passed through these critical speeds unless suitable damping means of the type shown were provided. Each of the damping assemblies 39 includes a pair of damping pads 40 formed of a suitable frictional material, each damping pad having a flat front surface 41 which (as will be more fully explained herebelow) is pressed against the flat surface of the member 38. As a result, upon oscillative movement of the moving system of machine 1 there will be a rubbing relationship between pads 40 and member 38, and energy will be absorbed by the pads thereby preventing an excessive amount of oscillation from occurring. Each damping pad 40 has a back surface 42, and it will be understood that the minimum thickness between the front surface 41 and the back surface 42 represents in effect the limiting factor of the useful life of the pad 40, since as soon as the minimum thickness is worn away the pad 40 is no longer serviceable.

Extending from the back surface 42 of each pad 40 is a projection 43 which has at least one part thereof in the shape of a segment of a circle when viewed in a plane perpendicular to surface 41. This can readily be seen from FIGURE 3, wherein the circular nature of projection 43 is readily visible, it being understood that the view taken is in precisely the type of a plane described. The preferred structure for projection 43 is that of a segment of a cylinder, that is, the projection 43 extends as shown in FIGURE 3 substantially or entirely across the width of the damping pad 40, as shown in FIGURE 2. I prefer to form the projection 43 so that the center 44 of the circle provided therein occurs at a distance from front surface 41 which is at least as great and preferably greater than the minimum thickness of the pad (which, as can readily be seen, occurs at the top and bottom edges).

The pads 40 are supported on opposite sides of member 38 by means of a leaf spring member 45 which is generally U-shaped, having its base or bight 46 secured to the base 47 of machine 1 and having its two legs 48 extending up on opposite sides of the member 38 so as to bias pads 40 toward each other and against member 38. Each leg 48 has its ends formed into three portions, a central portion 49 and two outer portions 50. The central portion 49 is formed as an arc of a circle concave relative to projection 43 and of like radius so that, as shown, it may receive the projection in mating relation therewith. More specifically, the central end portion 49 is formed as a segment of a hollow cylinder so as to mate fully with the projection 43.

The two outside portions 50 at the end of each leg 48 of member 45 are formed with inwardly extending projections 51, and the projections 51 extend into engagement with the side surfaces 52 of each pad 40 so as to form a pivot for the pad on a line which passes perpendicularly through the center of the circle formed by projection 43. In this connection, either recesses such as those shown by the numeral 53 may be preformed in the pad 40, or else the projections 51 may be of such sharpness and hardness relative to pad 40 that they form their own recesses upon assembly of the parts. In any event, when the parts are assembled, the pivot axis is, as stated, on a line passing perpendicularly through the center of the circle of projection 43 so that there is full cooperation between the supporting outside portions 50 and the portion 49, the portions 50 supporting the pad 40 for pivoting on an axis which causes sliding movement between projection 43 and part 49 of member 45 without any interference whatsoever between them. In addition, the pivots of the two pads 40 are on parallel lines for full cooperative action between the parts.

It will be seen that my invention provides an improved simplified damping assembly wherein an economical damping pad may be readily completely made by molding or extruding, and a simple one-piece U-shaped spring may be used to support a pair of such pads in the desired position.

It will therefore be understood that while in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of my invention.

What I claim as new and desire to secure by Letters Patent of the United States is:

1. For use with a flat member forming part of a system oscillative in up to three dimensions, a damping assembly comprising: a pair of damping pads respectively having flat front surfaces facing toward each other and adapted to be positioned on opposite sides of said flat member in rubbing relation thereto, each said pad having a back surface with a projection extending therefrom formed as a segment of a circle in a plane perpendicular to said front surface of said pad, and side surfaces joining said front and back surfaces; and biasing means adapted to bias said pads toward each other, said biasing means including a pair of central end portions formed as arcs of circles concave relative to said pad projections respectively and of like radius so as to receive said projections in mating relation therewith, said biasing means further having two outer end portions on each side of each said center end portion, each two outer end portions engaging the side surfaces of said pads respectively and forming parallel pivots for said pads along lines passing perpendicularly through the centers of the circles.

2. The apparatus defined in claim 1 wherein the biasing means comprises a substantially U-shaped spring metal member wherein said central and outer end portions are formed as the end of each leg of said U-shaped member, and said U-shaped member is adapted to be secured to a rigid base at its bight.

3. For use with a flat member forming part of a system oscillative in up to three dimensions, a damping assembly comprising: a damping pad having a flat front surface adapted to rub against said member, a back surface having a projection extending therefrom, and side surfaces joining said front and back surfaces; and a biasing member adapted to bias said pad against said flat member, said biasing member having a central end portion formed concave relative to said projection so as to receive said projection in mating relation therewith, said biasing member further having two outer end portions engaging said side surfaces and forming a pivot for said pad, said projection being formed as a segment of a cylinder having a circular cross section and extending along the pivot line of said pad with the center of said circle on said pivot line, said central end portion being formed as an arc of a circle of like radius to that of said projection.

4. For use in a damping assembly adapted to cooperate with a flat member forming part of a system oscillative in up to three dimensions: a damping pad having a flat front surface adapted to rub against said member, a back surface having a projection extending therefrom, and side surfaces joining said front and back surfaces, said projection being formed as a cylindrical projection extending substantially across said pad from one side surface to the other and having a cross section in the form of a segment of a circle in a plane perpendicular to said front surface, said projection being formed so that the center of said circle is at a greater distance behind said front surface than the minimum thickness of said pad between said front and back surfaces.

References Cited in the file of this patent

UNITED STATES PATENTS

| | | |
|---|---|---|
| 2,647,591 | Young | Aug. 4, 1953 |
| 2,793,757 | McWethy | May 28, 1957 |